(12) United States Patent
Atkins et al.

(10) Patent No.: US 12,243,033 B2
(45) Date of Patent: Mar. 4, 2025

(54) SYSTEMS AND METHODS FOR IDENTIFICATION AND AUTOMATION OF SHARED RECURRENT TRANSACTIONS BASED ON TRANSACTION PATTERN DETECTION

(71) Applicant: Capital One Services, LLC, McLean, VA (US)

(72) Inventors: Phoebe Atkins, Midlothian, VA (US); Xiaoguang Zhu, New York, NY (US); Ray Cheng, Long Island City, NY (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 3 days.

(21) Appl. No.: 18/122,072

(22) Filed: Mar. 15, 2023

(65) Prior Publication Data

US 2024/0311780 A1 Sep. 19, 2024

(51) Int. Cl.
*G06Q 20/10* (2012.01)
*G06Q 20/22* (2012.01)
*G06Q 20/40* (2012.01)

(52) U.S. Cl.
CPC ......... *G06Q 20/102* (2013.01); *G06Q 20/223* (2013.01); *G06Q 20/4014* (2013.01)

(58) Field of Classification Search
CPC . G06Q 20/102; G06Q 20/223; G06Q 20/4014
USPC .................................................. 705/35–45
See application file for complete search history.

(56) References Cited

U.S. PATENT DOCUMENTS

| | | | | |
|---|---|---|---|---|
| 8,484,104 | B1 * | 7/2013 | Hurlbutt | G06Q 40/00 705/40 |
| 8,571,981 | B1 * | 10/2013 | Laaser | G06Q 20/102 709/227 |
| 9,832,646 | B2 | 11/2017 | Richards et al. | |
| 10,134,023 | B2 | 11/2018 | Zhgeng et al. | |
| 10,540,646 | B2 | 1/2020 | Schlosser et al. | |
| 10,685,379 | B2 | 6/2020 | Purves et al. | |
| 10,699,264 | B1 | 6/2020 | Barman | |
| 11,222,352 | B2 | 1/2022 | Rose | |
| 11,354,442 | B2 | 6/2022 | Haldenby et al. | |

(Continued)

OTHER PUBLICATIONS

Notification of Transmittal of the International Search Report and the Written Opinion of the International Searching Authority issued in PCT/US2024/018888, mailed Jun. 7, 2024, 12 pages.

*Primary Examiner* — Robert R Niquette
(74) *Attorney, Agent, or Firm* — HUNTON ANDREWS KURTH LLP

(57) ABSTRACT

Systems and methods for implementing an automated process for detection of a shared recurring bills and identification of a set of corresponding person-to-person transactions associated with shared portions of the recurring bill. The identification process is prediction-based and contingent upon an analysis of a user's transaction records. A key aspect of the analysis is directed towards transaction amount data (fraction test) and occurrence patterns, derived from the transaction records, in order to identify a shared bill and a set of person-to-person (P2P) transfer transactions associated therewith. Upon identification of a set of P2P transfer transactions associated with a recurrent shared bill, an automation option may be provided to the user.

14 Claims, 9 Drawing Sheets

(56) References Cited

U.S. PATENT DOCUMENTS

| | | | |
|---|---|---|---|
| 2013/0262294 A1* | 10/2013 | Green | G06Q 20/023 |
| | | | 705/39 |
| 2015/0302510 A1* | 10/2015 | Godsey | G06Q 10/087 |
| | | | 705/26.81 |
| 2017/0091750 A1* | 3/2017 | Maim | H04L 9/14 |
| 2020/0193403 A1 | 6/2020 | Jabbour et al. | |
| 2020/0250648 A1 | 8/2020 | Sanchez et al. | |
| 2021/0406896 A1* | 12/2021 | Chaturvedi | G06Q 20/405 |
| 2023/0100928 A1* | 3/2023 | Ramamurthy | G06Q 20/407 |
| | | | 705/39 |
| 2024/0311780 A1* | 9/2024 | Atkins | G06Q 20/102 |

* cited by examiner

SYSTEMS AND METHODS FOR IDENTIFICATION AND AUTOMATION OF SHARED RECURRENT TRANSACTIONS BASED ON TRANSACTION PATTERN DETECTION

FIELD OF THE DISCLOSURE

The present disclosure relates to systems and methods for predicting transactional patterns from recorded transaction data, and more specifically to systems and methods for identifying transaction patterns associated with shared recurrent transactions.

BACKGROUND

Many people share expenses and recurring bills, such as utilities and online subscriptions. Initially, once a bill has been received, it must be paid. Once the bill has paid, it can be time consuming and cumbersome to calculate the amount due, provide reminders, and facilitate collection of reimbursements from multiple parties associated with a shared recurrent bill payments.

These and other deficiencies exist. Accordingly, there is a need for an automated solution based on predictive identification of shared recurrent transactions, to eliminate the time consuming, repetitive, and generally awkward processes of collecting reimbursements for a shared recurrent bill.

SUMMARY OF THE DISCLOSURE

One aspect of the present disclosure is directed to an automated process based on predictive identification of transactional patterns indicative of a shared recurrent transaction and automation of the bill sharing process with minimal user intervention.

Accordingly, embodiments of the present disclosure are directed to a method for automated detection of shared recurrent payment transactions, the method comprising: parsing a plurality of transaction records associated with one or more user financial accounts, wherein the plurality of transaction records are archived by one or more account servers associated with the one or more user financial accounts. The transaction records may be retrieved by linking a transaction aggregator to respective account servers associated with a user's financial accounts. The method may further comprise a step for identifying, from the plurality of transaction records, a set of transactions characterized by a fixed periodicity of occurrence. These transaction may then be marked as recurrent payment transactions. A second level of identification may involve extracting a merchant name from a transaction string marked as a recurrent payment transaction and matching the extracted merchant name with a group of service providers generally associated with recurrent payment transactions, such as standard utility and/or subscription-based services.

The method may further comprise a step for recording an occurrence time and an occurrence frequency for each of the identified recurring payment transaction. The occurrence time and frequency may then serve as inputs into a prediction model for identifying a set of corresponding person-to-person (P2P) transactions. The step of identifying one or more sets of P2P transactions corresponding to a recurrent payment transaction may comprise: identifying a set of recurring P2P transactions having a first transaction amount, and associated the set of P2P transactions with one or more recurrent payment transactions having a transaction amount that is a proper multiple of the first transaction amount. In other words, one aspect of the mapping operation for characterizing a set of P2P transactions as partial re-imbursements of a recurrent bill payment involves identification of recurring P2P transactions having a transaction amount that is a proper divisor of the recurrent payment transaction (e.g., a bill payment).

Another aspect of the mapping operation may involve matching one or more P2P transactions that pass the transaction amount test (e.g. proper divisor of one or more recurrent payment amounts) to a target recurrent transaction, such that the one or more P2P transactions correspond to a positive lag-time (e.g., a delay) and a matching periodicity with respect to the occurrence time and frequency of the target transaction, the occurrence time and frequency being recorded for transaction identified as a recurrent bill payments.

The method may further comprise a verification step prior to confirming a predicted mapping between a set of recurring P2P transactions and a recurrent merchant payment. In some embodiments, the verification step may involve displaying predicted mapping data, linking a set of recurring P2P transactions to a recurrent bill payment (e.g., a merchant payment), to the user and prompting the user for a verification response with regard to the predicted mapping. Upon receiving a mapping confirmation response from the user, the confirmed mapping data may be stored to facilitate automation of the set of recurring P2P transactions.

Based on the confirmed mapping data, the bill sharing process may be automated by generating one or more P2P electronic payment request messages for a shared recurrent payment. The one or more P2P electronic payment request messages may then be transmitted to the associated parties at a prespecified time following the occurrence of the target transaction (e.g., recurrent transaction.) The prespecified time may correspond to a user-provided value. In some embodiments, the transmission of the P2P payment requests, mapped to a target recurrent transaction, may proceed immediately following the occurrence of the target transaction in each respective payment cycle.

The method may further comprise a computational step for automated identification of conditions for halting the automation of a certain recurring bill. The automated response may be triggered by detection of a change in one or more user location identifying data, and removing mapping data that may no longer be valid in view of the detected change. The user location identifying data may corresponds to a primary mailing address provided by the user, a login Internet Protocol (IP) address associated with a user network access point and/or a location of stay derived from geo-location data acquired from a mobile device associated with the user.

Another aspect of the present disclosure is directed to a system for electronic processing of transaction record based on a prediction algorithm configured to detect shared transaction and automate a set of corresponding P2P transaction mapped thereto. The system may comprise: a computer hardware arrangement configure to: parse a plurality of transaction records associated with one or more user financial accounts, wherein the plurality of transaction records are archived by one or more account servers associated with the one or more user financial accounts. The computer hardware arrangement may be further configured to identify, based on a periodicity of occurrence, a plurality of recurrent payment transactions, from the plurality of transaction records, and record an occurrence time and an occurrence frequency for each of the plurality of recurrent payment transactions. The computer hardware arrangement may further be configured to associate a first set of recurring P2P transactions having a first transaction amount, with one or more recurrent payment transactions having a second transaction amount, wherein the first transaction amount is a proper divisor of the second transaction amount.

The computer arrangement may be further configured to match one or more P2P transactions, from the first set of recurring P2P transaction (e.g., the set of P2P transactions associated with the first transaction amount), to a target transaction from the one or more second recurrent payment transactions, wherein the one or more P2P transactions are associated with a positive time lag and a matching periodicity with respect to the recorded occurrence time and the occurrence frequency of the target transaction. The computer hardware arrangement may then generate a mapping between the one or more P2P transactions and the target payment transaction based on a mapping verification response from a user, and generate one or more P2P electronic payment request messages for the one or more P2P transactions at a prespecified time following the occurrence of the target transaction.

One aspect of the present disclosure is directed to a non-transitory computer-accessible medium comprising instructions for execution by a computer hardware arrangement, wherein, upon execution of the instructions the computer hardware arrange is configured to perform procedures comprising: parsing a plurality of transaction records associated with one or more user financial accounts, wherein the plurality of transaction records are archived by one or more account servers associated with the one or more user financial accounts, identifying, based on a periodicity of occurrence, a plurality of recurrent payment transactions, from the plurality of transaction records, recording an occurrence time and an occurrence frequency for each of the plurality of recurrent payment transaction, identifying, one or more recurrent payment transactions corresponding to one or more sets of recurrent person-to-person (P2P) transactions by: associating a first set of recurrent P2P transactions having a first transaction amount with one or more second recurrent payment transactions having a second transaction amount, wherein the first transaction amount is a proper divisor of the second transaction amount, matching one or more P2P transactions, from the first set of recurrent P2P transactions, to a target transaction from the one or more second recurrent payment transactions, wherein the one or more P2P transaction are associated with a positive time lag and a matching periodicity with respect to the occurrence time and the occurrence frequency recorded for the target transaction, generating a mapping between the one or more P2P transactions and the target payment transaction based on a mapping verification response from a user, and generating one or more P2P electronic payment request messages for the one or more P2P transactions at a prespecified time following the occurrence of the target transaction.

BRIEF DESCRIPTION OF THE DRAWINGS

Various embodiments of the present disclosure, together with further objects and advantages, may best be understood by reference to the following description taken in conjunction with the accompanying drawings.

DETAILED DESCRIPTION

Figure 1A:
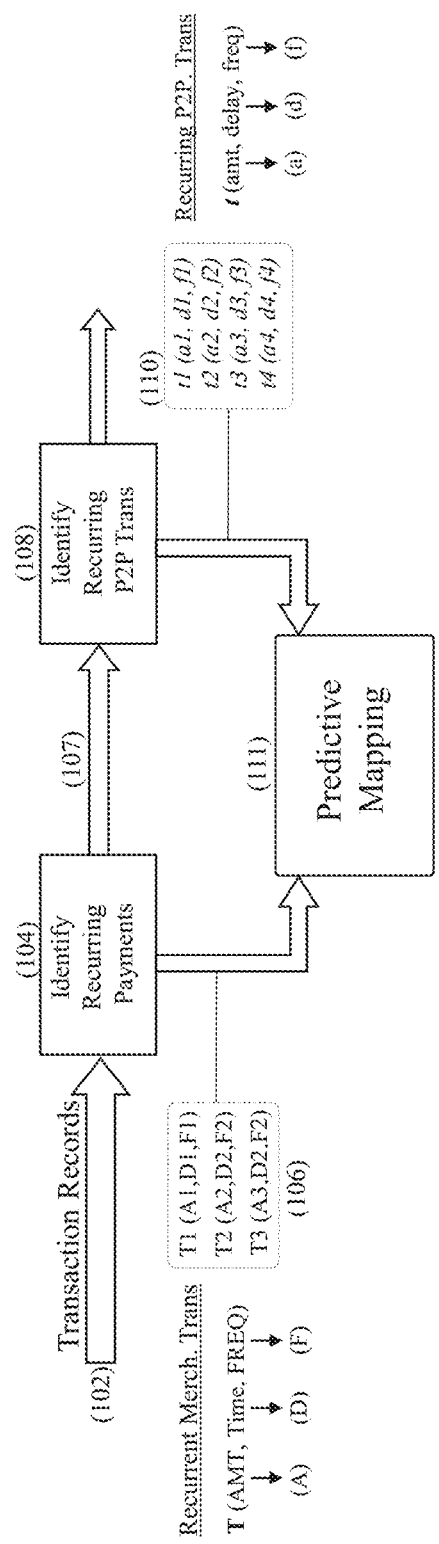
FIG. 1A illustrates an exemplary overview of the parsed transactional inputs used in implementation of an predictive mapping process, in accordance to some embodiments of the present disclosure.

The following description of exemplary embodiments provides non-limiting representative examples referencing numerals to particularly describe features and teachings of different aspects of the invention. The exemplary embodiments described will be recognized as capable of implementation separately, or in combination, with other exemplary embodiments from the description of the embodiments. A person of ordinary skill in the art reviewing the description of exemplary embodiments will be able to learn and understand the different described aspects of the invention. The description of exemplary embodiments should facilitate understanding of the invention to such an extent that other implementations, not specifically covered but within the knowledge of a person of skill in the art having read the description of exemplary embodiments, will be understood to be consistent with an application of the invention.

Furthermore, the described features, advantages, and characteristics of the exemplary embodiments may be combined in any suitable manner. One skilled in the relevant art will recognize that the exemplary embodiments may be practiced without one or more of the specific features or advantages of an exemplary embodiment. In other instances, additional features and advantages may be recognized in certain exemplary embodiments that may not be present in all exemplary embodiments. One skilled in the relevant art will understand that the described features, advantages, and characteristics of any exemplary embodiment can be interchangeably combined with the features, advantages, and characteristics of any other exemplary embodiment.

One aspect of the described system and method for implementing an automated mapping of shared payment transactions, involves an initial identification step for identifying a set of recurring person to person (P2P) transactions and a set of recurrent merchant payment transactions from a plurality of transaction records associated with a user. Recurring P2P transactions may be associated with incoming direct payment transactions from one or more personal user accounts. Recurrent merchant payment transactions, may be associated with outgoing payment transactions to one or more service providers associated, for example, with a monthly mortgage payment, utility service providers payments, loan and/or lease payments. The plurality of user transaction records, from which the recurrent merchant and recurring P2P transactions are identified, may be archived in a database and/or one or more account servers associated with the one or more user accounts. One solution for retrieving the plurality of transaction records may involve linking a transaction aggregator to the one or more account servers. The transaction records may also be stored on the account server that performs the identification of the identification of the shared payment transactions. The identification step may involve parsing of the plurality of transaction records to identify a set of recurrent merchant and recurring P2P transactions and extracting a relevant set of transaction attributes form the identified transactions. The identification step may be follows by a mapping step that uses the extracted transaction attributes to determined a periodicity of occurrence for the retrieved transaction records. If a matching periodicity of occurrence is determined between a recurrent merchant payment and a set of one or more recurring P2P transactions, the process may further identify one or more transactions from the set of P2P transaction associated with a transaction amount that is a proper divisor of the recurrent merchant payment transaction amount. The mapping process may furthermore determine a time lag between the identified P2P transactions (based on the periodicity of occurrence and transaction amount) and the corresponding recurrent merchant payment transaction. If a positive time lag between one or more P2P transactions (from the set of identified P2P transactions) and the corresponding recurrent merchant payment is determined (e.g., the associated P2P transaction occurs after the corresponding merchant payment) a predicted mapping may be established between the one or more P2P transactions and the corresponding merchant payment transaction. The predicted mapping may then be subject to a user confirmation prior to automation of the said P2P transactions. In case of new transaction records (e.g., transactions records retrieved in real time and/or recently archived transaction records) the identification process may involve transaction records occurring within a prespecified time window following an initial occurrence of the new transaction record. In this case, the positive time lag and the periodicity of occurrence (for determining a matching frequency pattern) may be verified within the prespecified time window following the initial occurrence of the new transaction record, to thereby identify the new transaction record as a recurring payment transaction subject to the mapping process.

FIG. 1A illustrates an exemplary process implementation (100) for automation of a bill sharing process based on predictive inter-mapping of recurring transactions. The exemplary system operation may involve identification of person-to-person (P2P) payment transactions for portions (fractions) of a shared bill, which is facilitated by analyzing a user's transaction records (102). With reference to example (100), transaction records (102) may undergo initial processing (104) to identify a set of recurrent merchant payment transactions (e.g., standard utility bills, subscription-based service fees, etc.) that may be characterized, for example, by a fixed periodicity of occurrence. These transactions may then be marked as recurrent payment transactions (106). A second level of identification for determining a set of recurrent (merchant) payment transactions (106) may involve the extraction of a merchant name from a respective transaction string and matching the extracted merchant name with a group of service providers generally associated with recurring payments, such as utility and/or subscription-based services. The recurrent merchant payment identification process (104) may further record transaction attributes such as a transaction amount (A), an occurrence time (D) and an occurrence frequency (F) for each of the identified recurrent payment transactions (106). Accordingly, recurrent transactions identified by process (104) may be represented as a function of corresponding transaction attributes (e.g., transaction amount, occurrence time and frequency.)

Following the identification of recurrent payment transactions (106), the remaining transaction records (107) may be scanned, by a process (108) to identify a set of recurring person-to-person (P2P) transactions (110). Similarly, the identification process (108) may further record a set of transaction attributes, such as a transaction amount (a), an occurrence time (d) and an occurrence frequency (f) for each of the identified recurring P2P transactions. Therefore, P2P transactions (110) identified by the process (108) may be represented as a function of corresponding transaction amount (a), occurrence time (d) and occurrence frequency (f) as shown in FIG. 1A. In some embodiments, the recurring P2P transaction identification process (108) may be performed at the same time as the recurrent merchant payment identification process (104).

Transactions marked as recurrent merchant payments (106) and transactions identified as recurring P2P transaction (110) are then inputted into a predictive computation model (111) for implementing the predictive inter-mapping operation (e.g., predicting existing associations between distinct sets of recurring P2P transactions and a corresponding recurrent merchant payment. The inter-mapping process may be implemented based on identifying correlations between the transaction attribute values (e.g., transaction amount, occurrence time and frequency) associated with the transaction set (106), as extracted by process (104), and the corresponding attribute values associated with the transaction set (110), as extracted by process (108). In some embodiments, the correlations process for each of the transaction attributes may be carried out in parallel to derive a one-to-one mapping between a set of recurring P2P transactions and a corresponding recurrent merchant transaction.

Figure 1B:
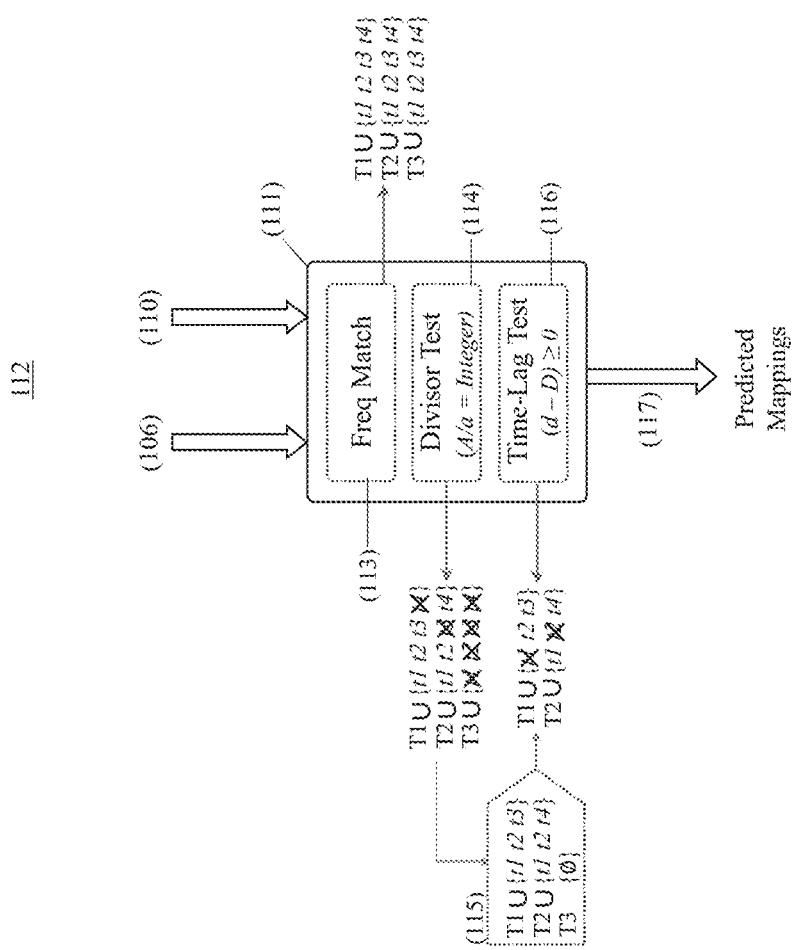
FIG. 1B illustrates an exemplary sub-processes for generating predicted mappings from the transactional input data, in accordance to some embodiments of the present disclosure.

FIG. 1B illustrates an exemplary inter-mapping process (112) for generating the predictive mapping (111). The exemplary in-mapping process (112), shown in FIG. 1B, may be implemented based on identifying correlations between the transaction attribute values (e.g., transaction amount, occurrence time and frequency). In accordance to some embodiments, the computational load may be reduced by conducting the correlation process in consecutive stages (e.g., each stage corresponding to correlation of a distinct transaction attribute) to narrow down the mapping at each stage until a one-to-one mapping between a set of recurring P2P transactions and a recurrent (merchant) payment transaction is obtained. For example, a frequency matching routine (e.g., 113) may map transactions based on the frequency of occurrence attribute (e.g., monthly, bi-monthly, etc.). If an occurrence frequency (f) of a recurring P2P transaction (t) does not match the occurrence frequency (F) of a recurrent merchant payment transaction (T), the corresponding P2P transaction (t) may be eliminated from a set of transactions that may be associated with the recurrent payment transaction (T). Corollary, P2P transactions with matching occurrence frequency to that of a recurrent merchant payment may be added to a set of possible matches for the recurrent merchant transaction. The next stage of correlation may be based on the transaction amount attribute and may involve the set of possible matches for each recurrent merchant transaction as determined by the frequency matching routine. The next stage of correlation may be based on the occurrence time attribute and may involve the set recurring P2P transactions that have cleared the previous correlation stages (e.g., with respect to the occurrence frequency and the transaction amount) for each recurrent merchant transaction.

Referring back to FIG. 1B, a frequency matching test (113), may map the identified recurrent P2P transactions (t1)-(t4), to each of the recurrent merchant payments (T1)-(T3). As such, the outcome of the frequency matching stage (113) may place each P2P transaction as a possible candidate for each of recurrent merchant payment (T1)-(T4), resulting in a three-to-three mapping between the recurring P2P transactions (t1)-(t4) and the recurrent merchant payments (T1)-(T3).

The next correlation stage may correspond to a transaction amount matching test (114) for mapping transactions based on the transaction amount attribute (e.g., A, a) to narrow the outcome of the previous stage by eliminating P2P transactions that do not match the transaction amount test. In some embodiments, the transaction amount test may correspond to determining whether a P2P transaction amount is a proper divisor of a recurrent merchant transaction amount. If a transaction amount (a) of a P2P transaction (t) is not a proper divisor of a transaction amount (A) of a recurring merchant payment transaction (T), the corresponding P2P transaction (t) may be eliminated from a set of transactions matching the occurrence frequency of recurrent payment transaction (T).

For example, with reference to FIG. 1B, a transaction amount correlation stage (114), implemented as a proper divisor test, may further narrow down the three-to-three mapping associated with the outcome of the previous correlation stage (113), by eliminating P2P transactions (t4) and (t3) from the set of candidate P2P transactions respectively mapped to recurrent payment transactions (T1) and (T2). Moreover, the entire set of P2P transactions (t1)-(t4) mapped to recurrent merchant transaction (T3) may be eliminated by the divisor test (114), as none of the P2P transaction amounts (a1)-(a4), illustrated in FIG. 1A, may be a proper divisor of the transaction amount (A3). As such recurring payment transaction (T3) corresponding to an empty set of candidate P2P transactions, may be identified as not corresponding to a shared bill and removed from further processing at the second correlation stage (114).

Referring back to FIG. 1B, a third correlation stage (116) may further narrow down the outcome (115) of the previous stage (114), based on a transaction occurrence time, by eliminating candidate P2P transactions from (115), that do not correspond to a positive time lag (e.g. delay) with respect to a corresponding recurrent payment transaction to which they have been mapped. In other words, if a transaction in a set of candidate P2P transactions mapped to a recurrent payment transaction at the end of the second correlation stage, is determined to occur prior to the recurrent payment transaction in a payment cycle (e.g., the transaction occurrence time (d) of a P2P transaction (t)), that otherwise meets the frequency and the proper divisor mapping criteria, does not exceeds (e.g., lags behind) the occurrence time of a recurring merchant payment transaction (T) the corresponding P2P transaction (t) is removed from the set of candidate P2P transactions generated by the previous stage.

The time-lag test (116), interchangeably referred to as a delay test for the purposes of the present disclosure, may compute the relative occurrence time of P2P transactions (t1) and (t2) with respect to the occurrence times (D1) and (D2) of recurrent payments (T1) and (T2), and further limit the sets of P2P transactions (115), associated with the outcome of the correlation stage (114), by eliminating (t1) from the set of P2P transactions associated with recurrent payment transactions (T1), and (t2) from the set of P2P transactions associated with recurrent payment transactions (T2). As such, according to example (112), time-lag test (116) may further narrow down the mapping predictions to a one-to-one mapping of (t2) and (t3) to (T1), and (t1) and (t4) to (T2) in the predicted mapping results (117). This is further illustrated in FIG. 1C.

Figure 1C:
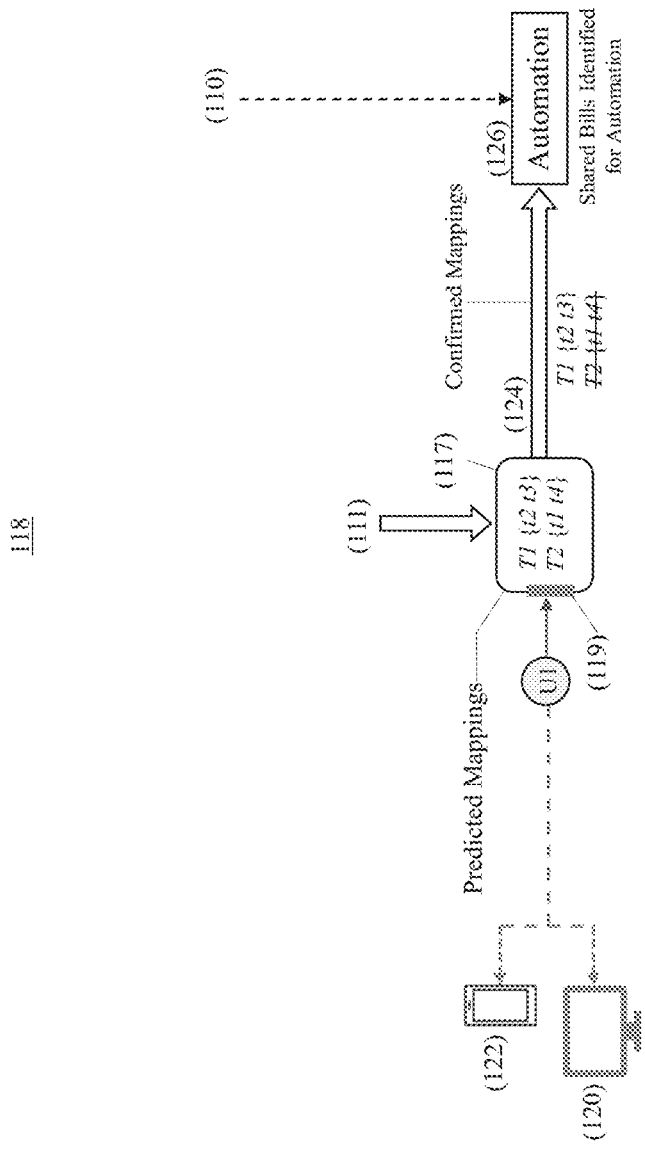
FIG. 1C illustrates an exemplary mapping confirmation process based on user-provided confirmation inputs, in accordance to some embodiments of the present disclosure.

As illustrated in example (118) of FIG. 1C, the predicted mapping data (117) may further undergo a verification process prior to being used to facilitate P2P payment requests automation. One element of the verification process may correspond to a user provided confirmation signal (U1). As such, the predicted mapping (117) may be provided and/or displayed to user via a user interface application (119) communicatively coupled to a user computing device (e.g., computer 120 and/or mobile device 122). A user confirmation and/or rejection response (U1), with respect to a predicted mapping between a set of P2P transactions and a corresponding shared bill payment, may then be retrieved from the user computing and/or mobile device, by the user interface application (119). A set of confirmed mappings (124) may then be transmitted to an automation process (126) which may then automate the recurrent P2P payment requests based on the confirmed mapping data (124). For example, in example (118), a User confirmation response (U1) may modify the predicted mappings (117) by eliminating the mapping of P2P transactions (t1) and (t4) to the recurrent payment transaction (T2), while confirming the predicted mapping for the recurrent payment transaction (T1). The confirmed mapping data linking recurrent payment transaction (T1) to the recurring P2P transactions (t2) and (t3) may then be provided to a payment request automation process (126) to facilitate the automation of corresponding P2P payment requests (110) illustrated in FIG. 1A.

Figure 1D:
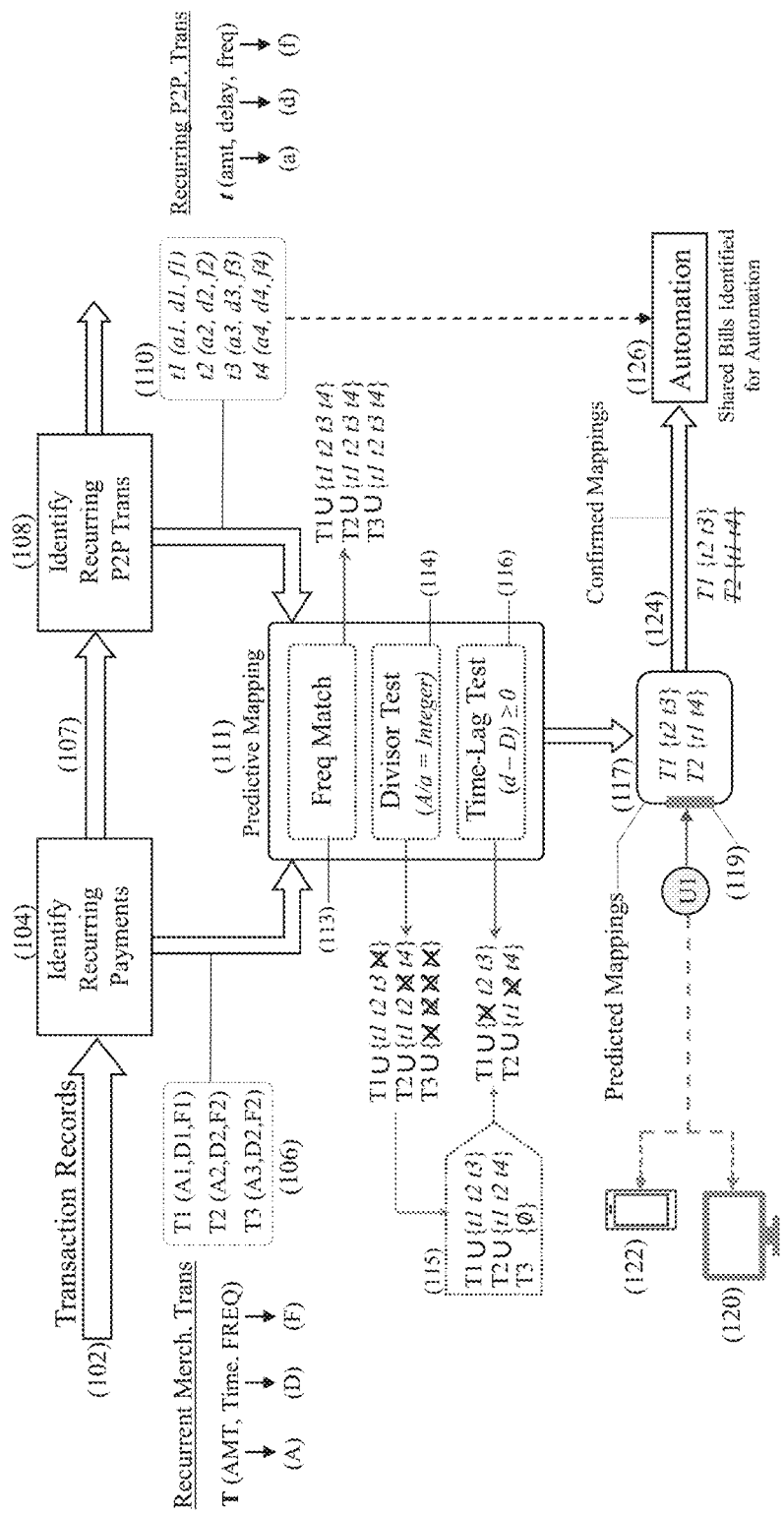
FIG. 1D illustrates an exemplary implementation overview diagram for an overall process directed to automation of shared recurrent payments based on predictive inter-mapping of recurring transactions and user-confirmation inputs, in accordance to some embodiments of the present disclosure.

Based on the confirmed mapping data, the bill sharing process may be automated by generating one or more P2P electronic payment request messages for a shared recurring payment. The one or more P2P electronic payment request messages may then be transmitted to the associated parties at a prespecified time following the occurrence of the target recurrent transaction during each payment cycle. An overview of the overall process for implementing an automated sharing of recurrent payments, involving identification of recurring payment and P2P transaction, generation of predictive inter-mapping between the recurring payments and P2P transactions, and filtering of the generated mapping information based on user-provided confirmation/rejection signal, is illustrated in FIG. 1D.

Figure 1E:
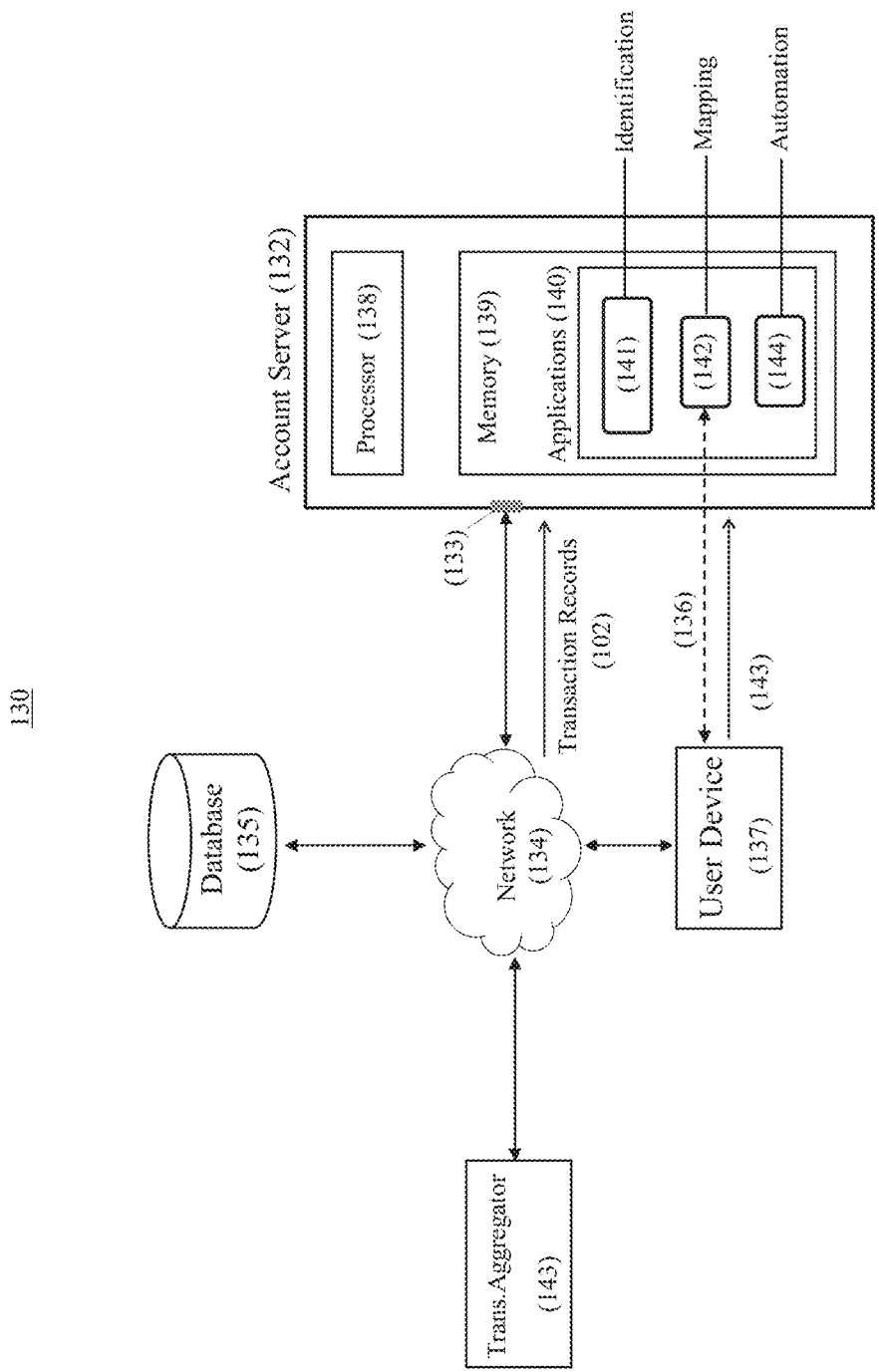
FIG. 1E illustrate an exemplary system implementation for the automation of shared recurrent payment based on predictive inter-mapping of recurring transactions, in accordance to some embodiments of the present disclosure.

FIG. 1E illustrates an exemplary system implementation (130) for the process described above and illustrated in FIGS. 1A-1C. According to the exemplary system implementation 130, the process of mapping a set of P2P transactions to a merchant payment and the automation of the mapped P2P transactions as described with references to FIGS. 1A-1C, may be implemented as one or more processes running on an account server (132). The exemplary system implementation (130) may comprise a network communication interface (133) for facilitating communication across a network (134), a database (135) that may be connected to the account server 132 via a direct point-to-point connection, or through the network (134), as well as a user interface (136) to facilitate communication with a user device (137), via for example the network (134). Although FIG. 1E illustrates single instance of components of system (130), system (130) may include any number of components.

The account server (132) may comprise a processor (138) and Memory (139). The processor (138) can be, for example, one or more microprocessors. The processor (138) can include processing circuitry, which can contain additional components, including additional processors, memories, error and parity/CRC checkers, data encoders, anti-collision algorithms, controllers, command decoders, security primitives and tamper-proofing hardware, as necessary to perform the functions described herein. The memory (139) may include one or more applications, such as applications (140) comprising instructions for execution thereon. For example, the applications (140) can reside in memory (139) and can comprise instructions for execution of the account server (132). The applications (138) of the account server (132) can be in communication with any components of system (130). For example, the account server (132) can execute one or more applications that enable, for example, network and/or data communications with one or more components of system (130) to transmit and receive data. According to the exemplary embodiment (130), the one or more processes associated with mapping a set of P2P transactions to a merchant payment and the automation of the mapped P2P transactions, as described with references to FIGS. 1A-1C, may be implemented as part of the applications (140). The one or more processor may correspond to the identification of recurring P2P and recurrent merchant payment transactions (141) and the generation of predictive mapping data therebetween (142). The predictive mapping may be confirmed via a user-provided confirmation signal (143), received from the user device (137). An automation process (144) may then automated the predictively mapped P2P transactions that have been confirmed by the user.

The account server (132) may be in data communication with any number of components of system (130). For example, account server (132) may be configured as a central system, server or platform to control and call various data at different times to execute a plurality of workflow actions. Account server (132) may be in data communication with a user device (137) via the networks (134). The account server (132) may transmit, for example from applications (138) executing thereon, one or more requests to transactions aggregator (143) and/or the database (135) for some or all of transaction records (102). The account server (132) may also transmit, applications (138), one or more requests for user confirmation signal (143) to the user device (137)

Without limitation, the account server (132) may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, a kiosk, a tablet, a terminal, an ATM, or other device.

The account server (132) can be a dedicated server computer, such as bladed servers, or can be a personal computers, laptop computers, notebook computers, palm top computers, network computers, mobile devices, wearable devices, or any processor-controlled device capable of supporting the system (132). The account server (132) may further include processing circuitry and may contain additional components, including processors, memories, error and parity/CRC checkers, data encoders, anticollision algorithms, controllers, command decoders, security primitives and tamper-proofing hardware, as necessary to perform the functions described herein.

The account server (132) may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein. While FIG. 1B illustrates a single server (132), it is understood that other embodiments can use multiple servers or multiple computer systems as necessary or desired to support the users and can also use back-up or redundant servers to prevent network downtime in the event of a failure of a particular server.

In some examples, network (134) may be one or more of a wireless network, a wired network or any combination of wireless network and wired network, and may be configured to connect to any one of components of system (130). For example, the account server (132) may be configured to connect to transaction aggregator (143), Database (135) and user device (137) via network (134). In some examples, network (134) may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network (134) may include, without limitation, telephone lines, fiber optics, IEEE Ethernet 902.3, a wide area network, a wireless personal area network, a LAN, or a global network such as the Internet. In addition, network (134) may support an Internet network, a wireless communication network, a cellular network, or the like, or any combination thereof. Network (134) may further include one network, or any number of the exemplary types of networks mentioned above, operating as a stand-alone network or in cooperation with each other. Network (134) may utilize one or more protocols of one or more network elements to which they are communicatively coupled. Network (134) may translate to or from other protocols to one or more protocols of network devices. Although network (134) is depicted as a single network, it should be appreciated that according to one or more examples, network (134) may comprise a plurality of interconnected networks, such as, for example, the Internet, a service provider's network, a cable television network, corporate networks, such as credit card association networks, and home networks.

System (130) can include one or more databases (135). The database (135) can comprise a relational database, a non-relational database, or other database implementations, and any combination thereof, including a plurality of relational databases and non-relational databases. In some examples, the database (135) can comprise a desktop database, a mobile database, or an in-memory database. Further, the database (135) can be hosted internally by any component of system (120), such as the account server (132), or the database (130) can be hosted externally to any component of the system (130), by a cloud-based platform, or in any storage device that is in data communication with the account server (132). In some examples, the database (135) can be in data communication with any number of components of system (130). For example, the account server (132) can be configured to retrieve the data requested by processor (138) from the database (135).

Figure 2:
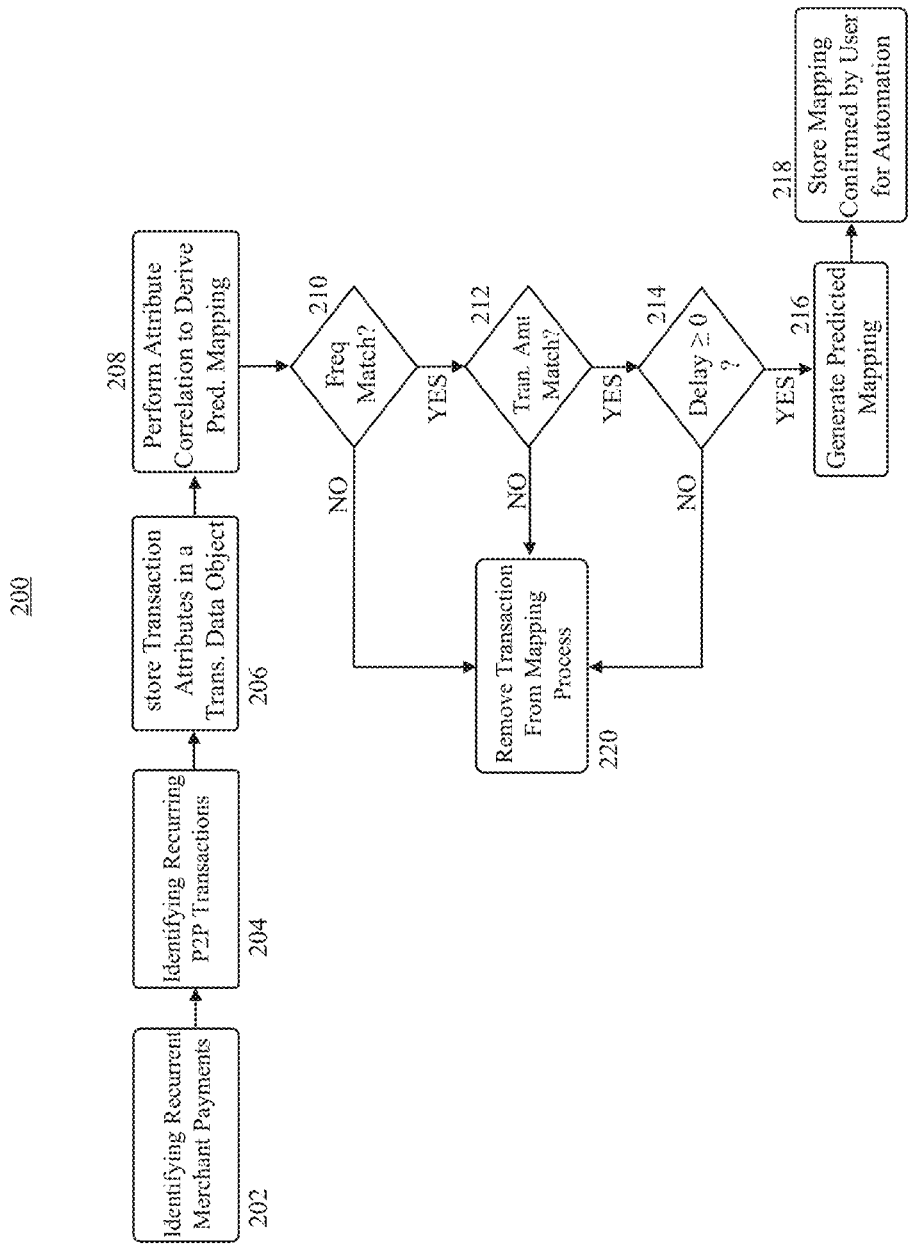
FIG. 2 illustrates an exemplary operational flow diagram for automation of shared recurrent payments based on predictive inter-mapping of recurring transactions, in accordance to some embodiments of the present disclosure.

FIG. 2 illustrates an exemplary operational flow diagram (200) for implementing inter-mapping of transaction records to enable identification of shared recurrent payment transaction and streamline the sharing process. Steps (202) and (204) of the flow diagram (200) are directed to identification of recurrent bill payments and recurring P2P transactions as inputs into the inter-mapping process. At step (206), relevant transaction data are extracted and stored as data objects, comprising a transaction identifier and a set of transaction attribute values, to drive the predictive mapping process. The prediction may involve performing a set of correlations between corresponding transaction attribute values respectively stored in data objects associated with recurrent payment transactions and recurring P2P transactions.

Referring back to FIG. 2, at step (208) corresponding transaction attributes are compared to identify existing correlations. The correlation process may be based on inter-mapping of transaction attributes, such as frequency of occurrence, transaction amount, and relative occurrence delay, between the recurrent (merchant) payment transactions (identified in step 202) and recurring P2P transactions (identified in step 204.) For example at step (210), an occurrence frequency associated with each of the identified P2P transactions may be correlated with an occurrence frequency of the recurrent payment transactions. If a positive correlation (matching occurrence frequencies to one or more recurrent payment transaction) is detected at step (210), the process may move to step (212) wherein a transaction amount for the matched P2P transactions may be correlated with a transaction amount of the recurrent payment transactions. A positive correlation at step (212) may be characterized by a P2P transaction amount that is a proper divisor of a transaction amount associated with a recurrent merchant payment. If positive correlation (P2P transaction amount that constitute a proper divisor of one or more recurrent payment amounts) is detected at step (212), the process may move to step (214).

At step (214) the occurrence time of each P2P transactions, with positive frequency and amount correlations to one or more recurrent payment transactions (e.g., from steps 210, 212) may be correlated with an occurrence time associated with each of the corresponding one or more recurrent payment transactions. The correlation process for the occurrence time attribute may involve computing a relative occurrence time for each P2P transactions. The relative occurrence time signifies a delay period (e.g. time-lag) with respect to the occurrence time of each of the corresponding one or more recurrent payment transactions. A positive correlation at step (214) may identify P2P transactions that proceed rather than precede a corresponding recurrent payment transaction in each payment cycle. If positive correlation (e.g., delay period that is equal or greater than zero) is observed at step (214), the process may move to step (216), wherein a set of predicted mapping based on the series of attribute correlation tests, conducted in steps (210), (212) and (214), is generated. The predicted mapping data may then be provided to a user, for example, via transmission from a user interface application, in communication with a user computing device. At step (218), the predicted mappings confirmed by the user may be stored to facilitate automation. Referring back to example (200), a negative outcome at any of the correlations steps (210, 212 and 214) moves the process to step (220) wherein the corresponding recurring P2P transactions is removed from further processing.

Figure 3:
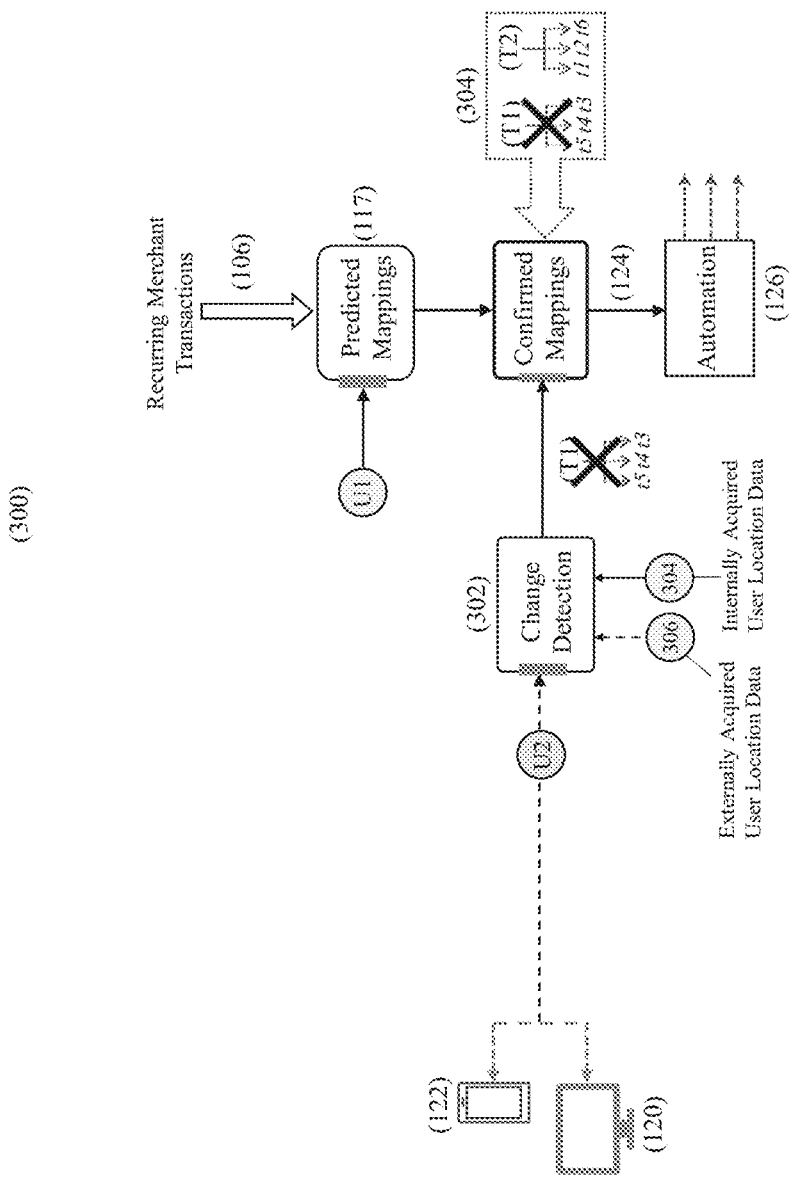
FIG. 3 illustrates an exemplary overview diagram for implementing a dynamic stop-automation scheme, in accordance to some embodiments of the present disclosure.

FIG. 3 illustrates an exemplary system and process implementation (300) for automated detection of a condition that may render one or more of the confirmed transactional mappings (124) (with reference to FIGS. 1C and D) invalid. For example, with reference to example 300, a shared utility bill (T1) may be recorded as being mapped to P2P transactions (t5), (t4) and (t3) and a shared streaming service subscription fee (T2) may be recorded as mapped to P2P transactions (t1), (t2), (t6). This may reflect sharing of recurring bills corresponding to a service that may be utilized by a group of house-mates. Therefore, a change in a user's mailing address and/or default location as detected, for example, by a change-detection process (302) may indicate that one or more distinct mappings associated with sharing of a recurring merchant payment may no longer be valid as the service may no longer be shared among the same group of roommates. Therefore detection of a condition corresponding to a change in a user's address may indicate that the user is no longer receiving P2P payment transfers from the same individuals. Such conditions may be derived from internal server data 304 (e.g., data internally stored in account server (132)), and/or externally acquired user location data 306 (e.g., data acquired from the user device (137)).

Internal server data (304) that may be used to indicate a potential stop-automation condition for one or more sets of recurring P2P transactions (e.g., a potential need to edit the confirmed mapping data) may correspond to a change in user's primary mailing address information stored in a user account (e.g., on the account server (132). Externally acquired user location data 306 may correspond to information indicative of a change in a user's most common location of presence, such as a change in the network access point (e.g., network internet protocol (IP) address) associated with the user computing device (120) and/or geo-location data corresponding to most likely stay at home times, extracted from a user's mobile device (122).

Referring back to FIG. 3, based on detection of input conditions, by process (302), that may indicate a need to re-compute the breakdown of a recurrent payment associated with a merchant type and/or termination of a recurrent payment transaction (e.g., based on internally and/or externally acquired data generally indicative of a change in a user general location of presence) a request for a user confirmation response regarding validity or expiration of one or more mappings (e.g., T1 and T2) may be transmitted to a user device (e.g., 120 and/or 122). Process 302 may be implemented as part of applications (140) running on the account server (132). Based on the received mapping confirmation and/or removal response (U2) from the user, one or more mapped recurrent transactions (e.g., T1 in FIG. 1) may be removed from the confirmed mapping data (304) stored, for example, in memory (139) of the account server (132). Mapping of new shared recurrent transactions and the associated breakdown across one or more P2P transactions may then proceed via the iterative mapping process based on transaction attribute correlation as described above. The mapping process may proceed in real time as sufficient transaction record data for computation of each transaction attribute becomes available.

Figure 4:
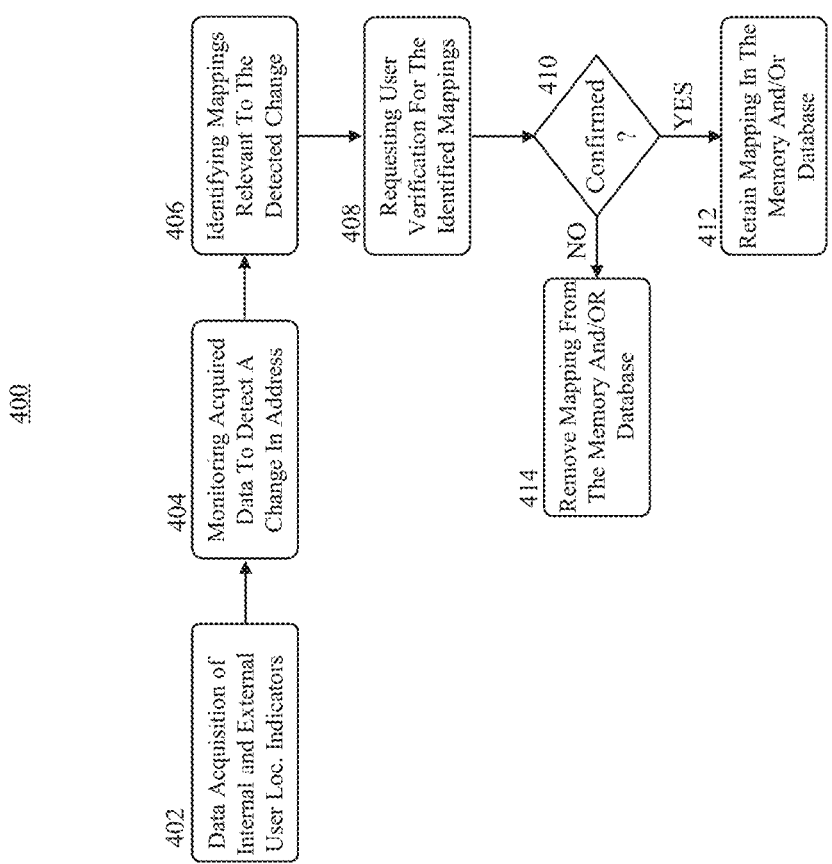
FIG. 4 illustrates an exemplary operational flow diagram for implementing a dynamic stop-automation scheme, in accordance to some embodiments of the present disclosure.

FIG. 4 illustrate an exemplary operational flow diagram (400) for implementing a functionality directed to automated termination and/or modification of confirmed transaction mappings, based on detection of a change in user's location of stay. Accordingly, with reference to the exemplary flow diagram (400), steps (402) and (404) are directed to the acquisition of relevant data from internal and external sources that may be indicative of a user's location of stay and monitoring of the acquired data to detect a change in the user's location of stay. As described above, such indicators may correspond to internally and/or externally acquired data. An internally acquired data indicative of a change in the user's location of stay may correspond to a change in a user's permanent mailing address stored as part of user account information on an account server. An externally acquired data indicative of a change in the user's location of stay may correspond to a change in the user's login IP address received across a network connection and/or the geo-location data, corresponding to a user's general location of presence, retrieved from a global positioning system (GPS) application running on a user mobile device.

Upon detection of a change in user's location of stay based on internal and/or external data, transaction mapping data relevant to the detected change may be identified at step (406). Shared recurrent transactions that may be relevant to a user's physical address may correspond, for example, to standard utility bills such as gas, water, electricity or cable bills. A user may also opt to retain or terminate sharing of certain subscription service fees, associated for example with media streaming services, when moving to a new location. At step (406), a set of mappings corresponding to the shared recurrent bills, identified as relevant to a user's physical address, is identified and at step (408) the identified mapping data may be presented to the user for verification based on the detected change in the user's location of stay, detected in step (404).

A user response may be processed at step (410) to determine if any of the identified mappings is to be removed. If an affirmative response (indicating validity of a particular recurrent payment shared among a set of P2P transactions) is received from the user, the identified mapping is retained in the memory for continued automation of the associated set of P2P transactions, as shown in step (412). Otherwise, the identified mapping may be removed from the memory at step (414). Incoming transaction records may then be further analyzed in accordance to an implementation illustrated in FIGS. 1A-1C and 2 to identify new recurrent payments that may be associated with a set of new recurring P2P transactions.

Figure 5:
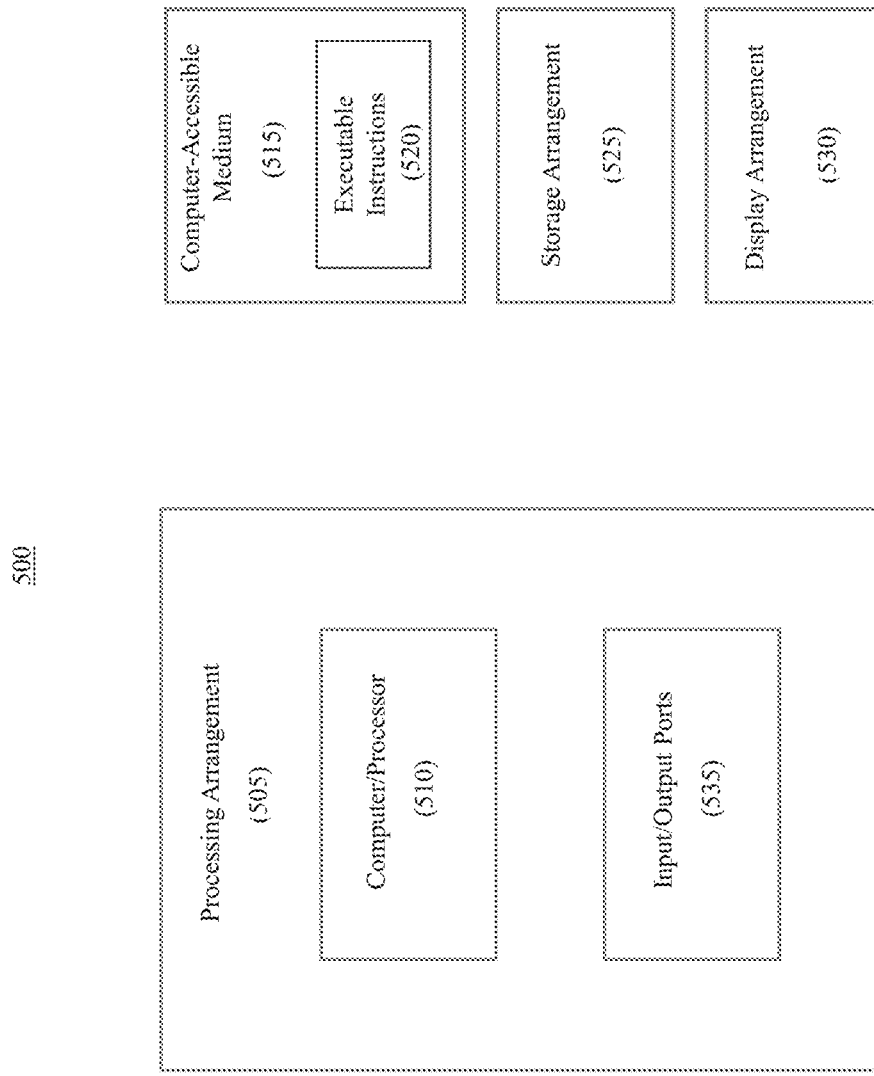
FIG. 5 is an illustration of an exemplary block diagram of an exemplary system, in accordance to some embodiments of the present disclosure.

FIG. 5 shows a block diagram of an exemplary embodiment of a system according to the present disclosure. For example, exemplary procedures in accordance with the present disclosure described herein can be performed by a processing arrangement and/or a computing arrangement (e.g., a computer hardware arrangement) 505. Such processing and/or computing arrangement 505 can be, for example entirely or a part of, or include, but not limited to, a computer and/or processor 510 that can include, for example one or more microprocessors, and use instructions stored on a computer-accessible medium (e.g., RAM, ROM, hard drive, or other storage device).

As shown in FIG. 5, for example a computer-accessible medium 515 (e.g., as described herein above, a storage device such as a hard disk, floppy disk, memory stick, CD-ROM, RAM, ROM, etc., or a collection thereof) can be provided (e.g., in communication with the processing arrangement 505). The computer-accessible medium 515 can contain executable instructions 520 thereon. In addition or alternatively, a storage arrangement 525 can be provided separately from the computer-accessible medium 515, which can provide the instructions to the processing arrangement 505 so as to configure the processing arrangement to execute certain exemplary procedures, processes, and methods, as described herein above, for example.

Further, the exemplary processing arrangement 505 can be provided with or include an input and/or output ports 535, which can include, for example a wired network, a wireless network, the internet, an intranet, a data collection probe, a sensor, etc. As shown in FIG. 5, the exemplary processing arrangement 505 can be in communication with an exemplary display arrangement 530, which, according to certain exemplary embodiments of the present disclosure, can be a touch-screen configured for inputting information to the processing arrangement in addition to outputting information from the processing arrangement, for example. Further, the exemplary display arrangement 530 and/or a storage arrangement 525 can be used to display and/or store data in a user-accessible format and/or user-readable format.

According to some embodiments, one or more data analytics and machine learning routines may be applied to supplement the computation of the processed user information as described above. This may be supplemented by a use of various prediction models such as ones that can utilize a Bidirectional Encoder Representations from Transformers (BERT) models. BERT models utilize use multiple layers of so called "attention mechanisms" to process textual data and make predictions. These attention mechanisms effectively allow the BERT model to learn and assign more importance to words from the text input that are more important in making whatever inference is trying to be made.

The exemplary system, method and computer-accessible medium can utilize various neural networks, such as convolutional neural networks (CNNs) or recurrent neural networks (RNNs), to generate the exemplary models. A CNN can include one or more convolutional layers (e.g., often with a subsampling step) and then followed by one or more fully connected layers as in a standard multilayer neural network. CNNs can utilize local connections and can have tied weights followed by some form of pooling which can result in translation invariant features.

A RNN is a class of artificial neural network where connections between nodes form a directed graph along a sequence. This facilitates the determination of temporal dynamic behavior for a time sequence. Unlike feedforward neural networks, RNNs can use their internal state (e.g., memory) to process sequences of inputs. A RNN can generally refer to two broad classes of networks with a similar general structure, where one is finite impulse and the other is infinite impulse. Both classes of networks exhibit temporal dynamic behavior. A finite impulse recurrent network can be, or can include, a directed acyclic graph that can be unrolled and replaced with a strictly feedforward neural network, while an infinite impulse recurrent network can be, or can include, a directed cyclic graph that may not be unrolled. Both finite impulse and infinite impulse recurrent networks can have additional stored state, and the storage can be under the direct control of the neural network. The storage can also be replaced by another network or graph, which can incorporate time delays or can have feedback loops. Such controlled states can be referred to as gated state or gated memory and can be part of long short-term memory networks (LSTMs) and gated recurrent units.

RNNs can be similar to a network of neuron-like nodes organized into successive "layers," each node in a given layer being connected with a directed e.g., (one-way) connection to every other node in the next successive layer. Each node (e.g., neuron) can have a time-varying real-valued activation. Each connection (e.g., synapse) can have a modifiable real-valued weight. Nodes can either be (i) input nodes (e.g., receiving data from outside the network), (ii) output nodes (e.g., yielding results), or (iii) hidden nodes (e.g., that can modify the data en route from input to output). RNNs can accept an input vector x and give an output vector y. However, the output vectors are based not only by the input just provided in, but also on the entire history of inputs that have been provided in the past.

For supervised learning in discrete time settings, sequences of real-valued input vectors can arrive at the input nodes, one vector at a time. At any given time step, each non-input unit can compute its current activation (e.g., result) as a nonlinear function of the weighted sum of the activations of all units that connect to it. Supervisor-given target activations can be supplied for some output units at certain time steps. For example, if the input sequence is a speech signal corresponding to a spoken digit, the final target output at the end of the sequence can be a label classifying the digit. In reinforcement learning settings, no teacher provides target signals. Instead, a fitness function, or reward function, can be used to evaluate the RNNs performance, which can influence its input stream through output units connected to actuators that can affect the environment. Each sequence can produce an error as the sum of the deviations of all target signals from the corresponding activations computed by the network. For a training set of numerous sequences, the total error can be the sum of the errors of all individual sequences.

The models described herein may be trained on one or more training datasets, each of which may comprise one or more types of data. In some examples, the training datasets may comprise previously collected data from a plurality of system users. Previously collected user data may correspond to a user transactional activity analyzed in conjunction, for example, with navigation data from a user mobile device.

In other examples, the training datasets may comprise continuously-collected data based on the current operation of the instant system and continuously-collected data from the operation of other systems (e.g., real-time tracking of electronic transaction data and the data from a user's GPS application.) In some examples, the training dataset may include anticipated data, such as the anticipated future travel pattern and purchasing action pattern, currently scheduled workloads, and planned future workloads, for the instant system and/or other systems. In other examples, the training datasets can include previous predictions for the instant system and other types of system and may further include results data indicative of the accuracy of the previous predictions. In accordance with these examples, the predictive models described herein may be training prior to use and the training may continue with updated data sets that reflect additional information.

In some aspects, the techniques described herein relate to a method for automated detection of shared payment transactions, the method including: parsing a plurality of transaction records associated with one or more user accounts, wherein the plurality of transaction records are archived by one or more account servers associated with the one or more user accounts; identifying, based on a periodicity of occurrence, a plurality of recurrent payment transactions, from the plurality of transaction records; recording an occurrence time and an occurrence frequency for each of the plurality of recurrent payment transaction; and identifying, one or more recurrent payment transactions corresponding to one or more sets of recurrent person-to-person (P2P) transactions, wherein identifying the one or more recurrent payment transactions includes: associating a first set of recurrent P2P transactions having a first transaction amount with one or more second recurrent payment transactions having a second transaction amount, wherein the first transaction amount is a proper divisor of the second transaction amount, matching one or more P2P transactions, from the first set of recurrent P2P transactions, to a target transaction from the one or more second recurrent payment transactions, wherein the one or more P2P transaction are associated with a positive time lag and a matching periodicity with respect to the occurrence time and the occurrence frequency recorded for the target transaction, generating a mapping between the one or more P2P transactions and the target payment transaction based on a mapping verification response from a user, and generating one or more P2P electronic payment request messages for the one or more P2P transactions at a prespecified time following the occurrence of the target transaction.

In some aspects, the techniques described herein relate to a method, wherein the prespecified time is determined by the user.

In some aspects, the techniques described herein relate to a method, wherein the plurality of transaction records are retrieved by linking a transaction aggregator to the one or more account servers associated with the one or more user accounts.

In some aspects, the techniques described herein relate to a method, further including: detecting a change in one or more first identifying data and removing one or more P2P to target transaction mappings generated prior to the detecting of the change in the one or more first identifying data.

In some aspects, the techniques described herein relate to a method, wherein the first identifying data corresponds to a primary mailing address provided by the user.

In some aspects, the techniques described herein relate to a method, wherein the first identifying data corresponds to one of a login Internet Protocol (IP) address and a geo-location data provided by a mobile device associated with the user.

In some aspects, the techniques described herein relate to a method, further including identifying a new transaction record as a recurring payment transaction by: extracting a merchant name from the new transaction record and matching the merchant name with a first group of service providers; and verifying a periodicity of occurrence, for the new transaction record, within a prespecified time window following an initial occurrence of the new transaction record.

In some aspects, the techniques described herein relate to a method, further including: identifying a set of new P2P transaction records having one or more transaction amounts that are proper divisors of a transaction amount associated with the new transaction record; and mapping one or more new P2P transactions from the set of new P2P transactions to the new transaction record, wherein an occurrence of the one or more new P2P transactions is associated with a positive time lag and a matching frequency pattern with respect to the new transaction record.

In some aspects, the techniques described herein relate to a method, wherein the positive time lag and the matching frequency pattern are verified within the prespecified time window following the initial occurrence of the new transaction record.

In some aspects, the techniques described herein relate to a method, wherein the first group of service providers corresponds to one or more utility service providers.

In some aspects, the techniques described herein relate to a method, wherein the first group of service providers corresponds to one or more subscription based service providers.

In some aspects, the techniques described herein relate to a method, wherein the first group of service providers corresponds to one of monthly mortgage and lease payment loan providers.

In some aspects, the techniques described herein relate to a system for identification of shared payment transactions, the system including a computer hardware arrangement configured to: parse a plurality of transaction records associated with one or more user accounts, wherein the plurality of transaction records are archived by one or more account servers associated with the one or more user accounts; identify, based on a periodicity of occurrence, a plurality of recurrent payment transactions, from the plurality of transaction records; record an occurrence time and an occurrence frequency for each of the plurality of recurrent payment transactions; associate a first set of recurrent P2P transaction having a first transaction amount with one or more second recurrent payment transactions having a second transaction amount, wherein the first transaction amount is a proper divisor of the second transaction amount; match one or more P2P transactions, from the first set of recurrent P2P transaction, to a target transaction from the one or more second recurrent payment transactions, wherein the one or more P2P transactions are associated with a positive time lag and a matching periodicity with respect to the occurrence time and the occurrence frequency recorded for the target transaction; generate a mapping between the one or more P2P transactions and the target payment transaction based on a mapping verification response from a user; and generate one or more P2P electronic payment request messages for the one or more P2P transactions at a prespecified time following the occurrence of the target transaction.

In some aspects, the techniques described herein relate to a system, wherein the hardware arrangement is further configured to detect a change in one or more first identifying data and remove one or more P2P to target transaction mappings generated prior to a detection of the change in the one or more first identifying data, the one or more first identifying data including one or more of a primary mailing address provided by the user, a login Internet Protocol (IP) address and a geo-location data provided by a mobile device associated with the user.

In some aspects, the techniques described herein relate to a system, wherein the hardware arrangement is further configured to: extract a merchant name from a new transaction record and match the merchant name with a first group of service providers; and verify a periodicity of occurrence, for the new transaction record, within a prespecified time window following an initial occurrence of the new transaction record, to thereby identify the new transaction record as a recurring payment transaction.

In some aspects, the techniques described herein relate to a system, wherein the hardware arrangement is further configured to: identify a set of new P2P transaction records having one or more transaction amounts that are proper divisors of a transaction amount associated with the new transaction record; and map one or more new P2P transactions from the set of new P2P transactions to the new transaction record, wherein an occurrence of the one or more new P2P transactions is associated with a positive time lag and a matching frequency pattern with respect to the new transaction record.

In some aspects, the techniques described herein relate to a non-transitory computer-accessible medium including instructions for execution by a computer hardware arrangement, wherein, upon execution of the instructions the computer hardware arrange is configured to perform procedures including: parsing a plurality of transaction records associated with one or more user accounts, wherein the plurality of transaction records are archived by one or more account servers associated with the one or more user accounts; identifying, based on a periodicity of occurrence, a plurality of recurrent payment transactions, from the plurality of transaction records; recording an occurrence time and an occurrence frequency for each of the plurality of recurrent payment transactions; identifying, one or more recurrent payment transactions corresponding to one or more sets of recurrent person-to-person (P2P) transactions, wherein identifying the one or more recurrent payment transactions includes: associating a first set of recurrent P2P transaction having a first transaction amount with one or more second recurrent payment transactions having a second transaction amount, wherein the first transaction amount is a proper divisor of the second transaction amount, matching one or more P2P transactions, from the first set of recurrent P2P transaction, to a target transaction from the one or more second recurrent payment transactions, wherein the one or more P2P transaction are associated with a positive time lag and a matching periodicity with respect to the occurrence time and the occurrence frequency recorded for the target transaction, generating a mapping between the one or more P2P transactions and the target payment transaction based on a mapping verification response from a user, and generating one or more P2P electronic payment request messages for the one or more P2P transactions at a prespecified time following the occurrence of the target transaction.

In some aspects, the techniques described herein relate to a non-transitory computer-accessible medium further including instructions for detecting a change in one or more first identifying data and removing one or more P2P to target transaction mappings generated prior to the detecting of the change in the one or more first identifying data, the one or more first identifying data including one or more of a primary mailing address provided by the user, a login Internet Protocol (IP) address and a geo-location data provided by a mobile device associated with the user.

In some aspects, the techniques described herein relate to a non-transitory computer-accessible medium, further including instructions for identifying a new transaction record as a recurring payment transaction by: extracting a merchant name from the new transaction record and matching the merchant name with a first group of service providers; and verifying a periodicity of occurrence, for the new transaction record, within a prespecified time window following an initial occurrence of the new transaction record.

In some aspects, the techniques described herein relate to a non-transitory computer-accessible medium further including instruction for identifying a set of new P2P transaction records having one or more transaction amounts that are proper divisors of a transaction amount associated with the new transaction record; and mapping one or more new P2P transactions from the set of new P2P transactions to the new transaction record, wherein an occurrence of the one or more new P2P transactions is associated with a positive time lag and a matching frequency pattern with respect to the new transaction record, the positive time lag and the matching frequency being determined based on the prespecified time window following the initial occurrence of the new transaction record.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only and is not intended to be limiting.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

Computer readable program instructions described herein can be downloaded to respective computing and/or processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing and/or processing device receives computer readable program instructions from the network and forwards the computer readable program instructions for storage in a computer readable storage medium within the respective computing and/or processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions specified herein. These computer-readable program instructions may also be stored in a computer-readable storage medium that can direct a computer, a programmable data processing apparatus, and/or other devices to function in a manner, such that the computer readable storage medium having instructions stored therein comprises an article of manufacture including instructions which implement aspects of the functions specified herein.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions specified herein.

In the preceding specification, various embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

The invention claimed is:

1. A method for automated detection of shared payment transactions, the method comprising:
   parsing a plurality of transaction records associated with one or more user accounts, wherein the plurality of transaction records is archived by one or more account servers associated with the one or more user accounts, wherein the plurality of transaction records are retrieved by linking a transaction aggregator to the one or more account servers associated with the one or more user accounts;
   identifying, based on a periodicity of occurrence, a plurality of recurrent payment transactions, from the plurality of transaction records;
   recording an occurrence time and an occurrence frequency for each of the plurality of recurrent payment transaction; and
   identifying, one or more recurrent payment transactions corresponding to one or more sets of recurrent person-to-person (P2P) transactions, wherein identifying the one or more recurrent payment transactions comprises:
      associating a first set of recurrent P2P transactions having a first transaction amount with one or more second recurrent payment transactions having a second transaction amount, wherein the first transaction amount is a proper divisor of the second transaction amount,
      matching one or more P2P transactions, from the first set of recurrent P2P transactions, to a target transaction from the one or more second recurrent payment transactions, wherein the one or more P2P transaction are associated with a positive time lag and a matching periodicity with respect to the occurrence time and the occurrence frequency recorded for the target transaction,
      generating a mapping between the one or more P2P transactions and the target payment transaction based on a mapping verification response from a user,
      detecting a change in one or more first identifying data and removing one or more P2P to target transaction mappings generated prior to the detecting of the change in the one or more first identifying data wherein the first identifying data corresponds to one of a login Internet Protocol (IP) address and a geo-location data provided by a mobile device associated with the user,
      providing and displaying the mapping to a user via a user interface application of a user computing device,
      receiving from the user a user confirmation with respect to the mapping via the user interface application of the user computing device, and
      generating one or more P2P electronic payment request messages for the one or more P2P transactions at a prespecified time following the occurrence of the target transaction.

2. The method of claim 1, wherein the prespecified time is determined by the user.

3. The method of claim 1, wherein the first identifying data further corresponds to a primary mailing address provided by the user.

4. The method of claim 1, further comprising identifying a new transaction record as a recurring payment transaction by:
   extracting a merchant name from the new transaction record and matching the merchant name with a first group of service providers; and
   verifying a periodicity of occurrence, for the new transaction record, within a prespecified time window following an initial occurrence of the new transaction record.

5. The method of claim 4, further comprising:
   identifying a set of new P2P transaction records having one or more transaction amounts that are proper divisors of a transaction amount associated with the new transaction record; and
   mapping one or more new P2P transactions from the set of new P2P transactions to the new transaction record, wherein an occurrence of the one or more new P2P transactions is associated with a positive time lag and a matching frequency pattern with respect to the new transaction record.

6. The method of claim 5, wherein the positive time lag and the matching frequency pattern are verified within the prespecified time window following the initial occurrence of the new transaction record.

7. The method of claim 4, wherein the first group of service providers corresponds to one or more utility service providers.

8. A system for identification of shared payment transactions, the system comprising:
   a computer hardware arrangement, comprising a computer processor and computer memory, configured to:
   parse a plurality of transaction records associated with one or more user accounts, wherein the plurality of transaction records is archived by one or more account servers associated with the one or more user accounts;
   identify, based on a periodicity of occurrence, a plurality of recurrent payment transactions, from the plurality of transaction records;
   record an occurrence time and an occurrence frequency for each of the plurality of recurrent payment transactions;
   associate a first set of recurrent P2P transaction having a first transaction amount with one or more second recurrent payment transactions having a second transaction amount, wherein the first transaction amount is a proper divisor of the second transaction amount;
   match one or more P2P transactions, from the first set of recurrent P2P transaction, to a target transaction from the one or more second recurrent payment transactions, wherein the one or more P2P transactions are associated with a positive time lag and a matching periodicity with respect to the occurrence time and the occurrence frequency recorded for the target transaction;
   generate a mapping between the one or more P2P transactions and the target payment transaction based on a mapping verification response from a user;
   detect a change in one or more first identifying data and removing one or more P2P to target transaction mappings generated prior to the detecting of the change in the one or more first identifying data, the one or more first identifying data comprising one or more of a primary mailing address provided by the user, a login Internet Protocol (IP) address and a geo-location data provided by a mobile device associated with the user;
   provide and display the mapping to a user via a user interface application of a user computing device;
   receive from the user a user confirmation with respect to the mapping via the user interface application of the user computing device; and generate one or more P2P electronic payment request messages for the one or more P2P transactions at a prespecified time following the occurrence of the target transaction.

9. The system of claim 8, wherein the computer hardware arrangement is further configured to detect a change in one or more first identifying data and remove one or more P2P to target transaction mappings generated prior to a detection of the change in the one or more first identifying data, the one or more first identifying data comprising one or more of a primary mailing address provided by the user, a login Internet Protocol (IP) address and a geo-location data provided by a mobile device associated with the user.

10. The system of claim 8, wherein the computer hardware arrangement is further configured to:
   extract a merchant name from a new transaction record and match the merchant name with a first group of service providers; and
   verify a periodicity of occurrence, for the new transaction record, within a prespecified time window following an initial occurrence of the new transaction record, to thereby identify the new transaction record as a recurring payment transaction.

11. The system of claim 10, wherein the computer hardware arrangement is further configured to:
   identify a set of new P2P transaction records having one or more transaction amounts that are proper divisors of a transaction amount associated with the new transaction record; and
   map one or more new P2P transactions from the set of new P2P transactions to the new transaction record, wherein an occurrence of the one or more new P2P transactions is associated with a positive time lag and a matching frequency pattern with respect to the new transaction record.

12. A non-transitory computer-accessible medium comprising instructions for execution by a computer hardware arrangement, wherein, upon execution of the instructions the computer hardware arrange is configured to perform procedures comprising:
   parsing a plurality of transaction records associated with one or more user accounts, wherein the plurality of transaction records is archived by one or more account servers associated with the one or more user accounts;
   identifying, based on a periodicity of occurrence, a plurality of recurrent payment transactions, from the plurality of transaction records;
   recording an occurrence time and an occurrence frequency for each of the plurality of recurrent payment transactions;
   identifying, one or more recurrent payment transactions corresponding to one or more sets of recurrent person-to-person (P2P) transactions, wherein identifying the one or more recurrent payment transactions comprises:
      associating a first set of recurrent P2P transaction having a first transaction amount with one or more second recurrent payment transactions having a second transaction amount, wherein the first transaction amount is a proper divisor of the second transaction amount,
      matching one or more P2P transactions, from the first set of recurrent P2P transaction, to a target transaction from the one or more second recurrent payment transactions, wherein the one or more P2P transaction are associated with a positive time lag and a matching periodicity with respect to the occurrence time and the occurrence frequency recorded for the target transaction,
   generating a mapping between the one or more P2P transactions and the target payment transaction based on a mapping verification response from a user,
   detecting a change in one or more first identifying data and removing one or more P2P to target transaction mappings generated prior to the detecting of the change in the one or more first identifying data, the one or more first identifying data comprising one or more of a primary mailing address provided by the user, a login Internet Protocol (IP) address and a geo-location data provided by a mobile device associated with the user,
   providing and displaying the mapping to a user via a user interface application of a user computing device,
   receiving from the user a user confirmation with respect to the mapping via the user interface application of the user computing device, and
   generating one or more P2P electronic payment request messages for the one or more P2P transactions at a prespecified time following the occurrence of the target transaction.

13. The non-transitory computer-accessible medium of claim 12, further comprising instructions for identifying a new transaction record as a recurring payment transaction by:
   extracting a merchant name from the new transaction record and matching the merchant name with a first group of service providers; and
   verifying a periodicity of occurrence, for the new transaction record, within a prespecified time window following an initial occurrence of the new transaction record.

14. The non-transitory computer-accessible medium of claim 13 further comprising instruction for identifying a set of new P2P transaction records having one or more transaction amounts that are proper divisors of a transaction amount associated with the new transaction record; and
   mapping one or more new P2P transactions from the set of new P2P transactions to the new transaction record, wherein an occurrence of the one or more new P2P transactions is associated with a positive time lag and a matching frequency pattern with respect to the new transaction record, the positive time lag and the matching frequency being determined based on the prespecified time window following the initial occurrence of the new transaction record.

* * * * *